(12) United States Patent
Sande

(10) Patent No.: US 6,705,662 B2
(45) Date of Patent: Mar. 16, 2004

(54) CONVERTIBLE WITH A LID PART IN THE REAR OF THE VEHICLE

(75) Inventor: Holger im Sande, Osnabrück (DE)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 10/200,003

(22) Filed: Jul. 19, 2002

(65) Prior Publication Data

US 2003/0025350 A1 Feb. 6, 2003

(30) Foreign Application Priority Data

Jul. 20, 2001 (DE) .......................................... 101 35 581

(51) Int. Cl.[7] .................................................. B60J 7/00
(52) U.S. Cl. ..................... 296/107.08; 296/76; 296/136
(58) Field of Search ............................ 296/107.08, 136, 296/76

(56) References Cited

U.S. PATENT DOCUMENTS

| | | | | |
|---|---|---|---|---|
| 4,307,875 A | * | 12/1981 | Schnitzius et al. | 267/120 |
| 4,629,157 A | * | 12/1986 | Tsuchiya et al. | 251/96 |
| 5,823,606 A | * | 10/1998 | Schenk et al. | 296/107.08 |
| 6,010,178 A | * | 1/2000 | Hahn et al. | 296/107.08 |
| 6,164,713 A | * | 12/2000 | Graf et al. | 296/107.08 |
| 6,186,577 B1 | * | 2/2001 | Guckel et al. | 296/107.08 |
| 6,193,300 B1 | * | 2/2001 | Nakatomi et al. | 296/107.08 |
| 6,250,707 B1 | * | 6/2001 | Dintner et al. | 296/107.08 |
| 6,270,144 B1 | * | 8/2001 | Schenk | 296/107.08 |
| 6,352,298 B1 | * | 3/2002 | Hayashi et al. | 296/107.08 |
| 2002/0093218 A1 | * | 7/2002 | Weissmueller et al. | 296/107.08 |
| 2002/0109372 A1 | * | 8/2002 | Weissmueller | 296/107.08 |
| 2002/0149227 A1 | * | 10/2002 | Wagner et al. | 296/107.08 |

FOREIGN PATENT DOCUMENTS

| | | |
|---|---|---|
| DE | 4445944 | 4/1996 |
| DE | 100 28 405 A1 | 1/2001 |
| DE | 199 32 501 A1 | 2/2001 |
| EP | 0949103 | 10/1999 |

\* cited by examiner

*Primary Examiner*—D. Glenn Dayoan
*Assistant Examiner*—Lori L Coletta
(74) *Attorney, Agent, or Firm*—Friedrich Kueffner

(57) ABSTRACT

A convertible has a car body and a lid part arranged to the rear of the car body. The convertible top can be stowed under the lid part. The lid part can open and close for releasing a through opening for the top adjacent to a forward end of the lid part and for releasing a loading opening for luggage adjacent to a rearward end of the lid part. An auxiliary frame is arranged underneath the lid part in a closed position of the lid part. The auxiliary frame is connected pivotably on the car body and is pivotable transversely to the travel direction about a pivot axis. The pivot axis of the auxiliary frame, in the travel direction of the convertible, is arranged in front of the rearward end of the lid part.

13 Claims, 9 Drawing Sheets

CONVERTIBLE WITH A LID PART IN THE REAR OF THE VEHICLE

BACKGROUND OF THE INVENTION

1. Field of the Invention

The invention relates to a convertible comprising a top foldable or storable in the rear vehicle area underneath a lid part, wherein the lid part can be opened and closed for releasing a through opening for the top located adjacent to its forward end and for releasing a loading opening for luggage located adjacent to its rearward end. Underneath the lid part, an auxiliary frame is provided which is pivotably connected to the vehicle body and is pivotable about an axis extending transversely to the vehicle.

2. Description of the Related Art

A convertible of the aforementioned kind is disclosed in German patent 44 45 944 C1. It has a lid part connected to an auxiliary frame and is movable for releasing a through opening for the top and for releasing a loading opening for luggage. This auxiliary frame, which pivots upwardly when the lid part is opened for releasing the through opening for the top and in this way provides a supporting function for the lid part from below, is provided with a pivot axis underneath a terminal end area about which the auxiliary frame together with the lid part can be moved. It is necessary to provide space within the area of the taillights or the lower terminal edge of the rearward end of the lid part in order to be able to arrange the pivot axis. This requires that the rearward end of the lid part is positioned relatively high; this prevents the desirable low positioning of the trunk sill. Moreover, positioning possibilities of the taillights are limited in this way. Accordingly, the design possibilities for the configuration of the rear of the vehicles are thus limited.

SUMMARY OF THE INVENTION

It is an object of the present invention to provide an improvement for the described problems.

In accordance with the present invention, this is achieved in that the pivot axis of the auxiliary frame is located in front of the rearward end of the lid part in the travel direction. This is further achieved in that a first movement sequence for releasing the through opening for the top comprises first an opening of the rearward end of the lid part and subsequently an upward pivoting of the entire lid part about a pivot axis which is forwardly displaced relative to the rearward end.

The forward displacement of the pivot axis according to the invention does not cause any limitations with regard to positioning of the taillights or the terminal edge of the lid part within the rearward end of the lid part. The trunk sill can therefore be positioned very low. Also, the design of the taillights is not limited by requirements concerning the position of the pivot axis.

Moreover, when the pivot axis is also moved upwardly, there are special advantages with respect to the trunk space use because the width of the bottom area is completely available and possibly required support members or the like which comprise the pivot axis can be arranged in the upwardly positioned lateral areas without this causing any limitations within the lower area of the trunk space providing the support surface for luggage. In order to prevent that the space savings achieved by the displacement of the pivot axis of the auxiliary frame are lost again by the additional drive or drive-assisting element, the latter is positioned particularly advantageously in front of the pivot axis of the auxiliary frame in the travel direction.

When providing the possibility of a relative movement between the lid part and the auxiliary frame, the lid part, upon opening the lid part for receiving luggage, can be moved independently of the auxiliary frame, for example, by means of a multi-bar mechanism while the auxiliary frame remains in its rest position. In this way, the movement sequence is simplified and the masses to be moved are minimal.

When for enabling the relative movement between the auxiliary frame and the lid part a further drive or drive-assisting member is provided, the opening movement of the lid part for releasing the through opening for the top can be carried out in an automatic multi-step way.

An especially favorable movement sequence results when first the rearward end of the lid part is lifted in a first movement phase for releasing the through opening for the top and in a second movement phase is pivoted about a forwardly displaced pivot axis so as to open to the rear.

It is particularly beneficial to perform the pivot movement for opening to the rear such that the rearward end of the lid part is positioned below and behind its initial position because in this way the opening height of the pivoting lid part is reduced so that the risk of impact, for example, on a garage ceiling is minimized.

DESCRIPTION OF THE PREFERRED EMBODIMENTS

Figure 1:
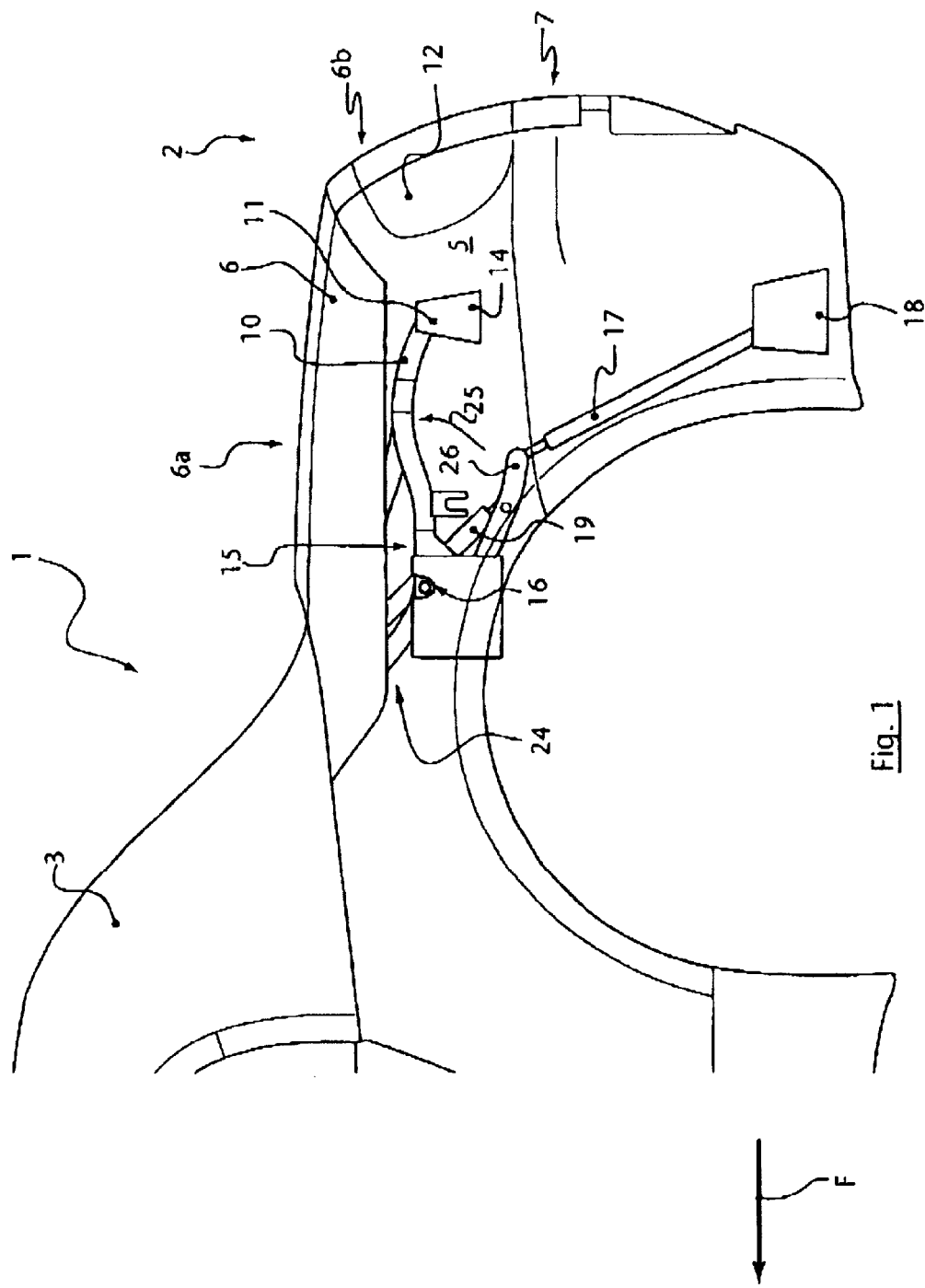
FIG. 1 shows the rear area of a convertible according to the invention in a schematic view with the lid part closed.
Figure 2:
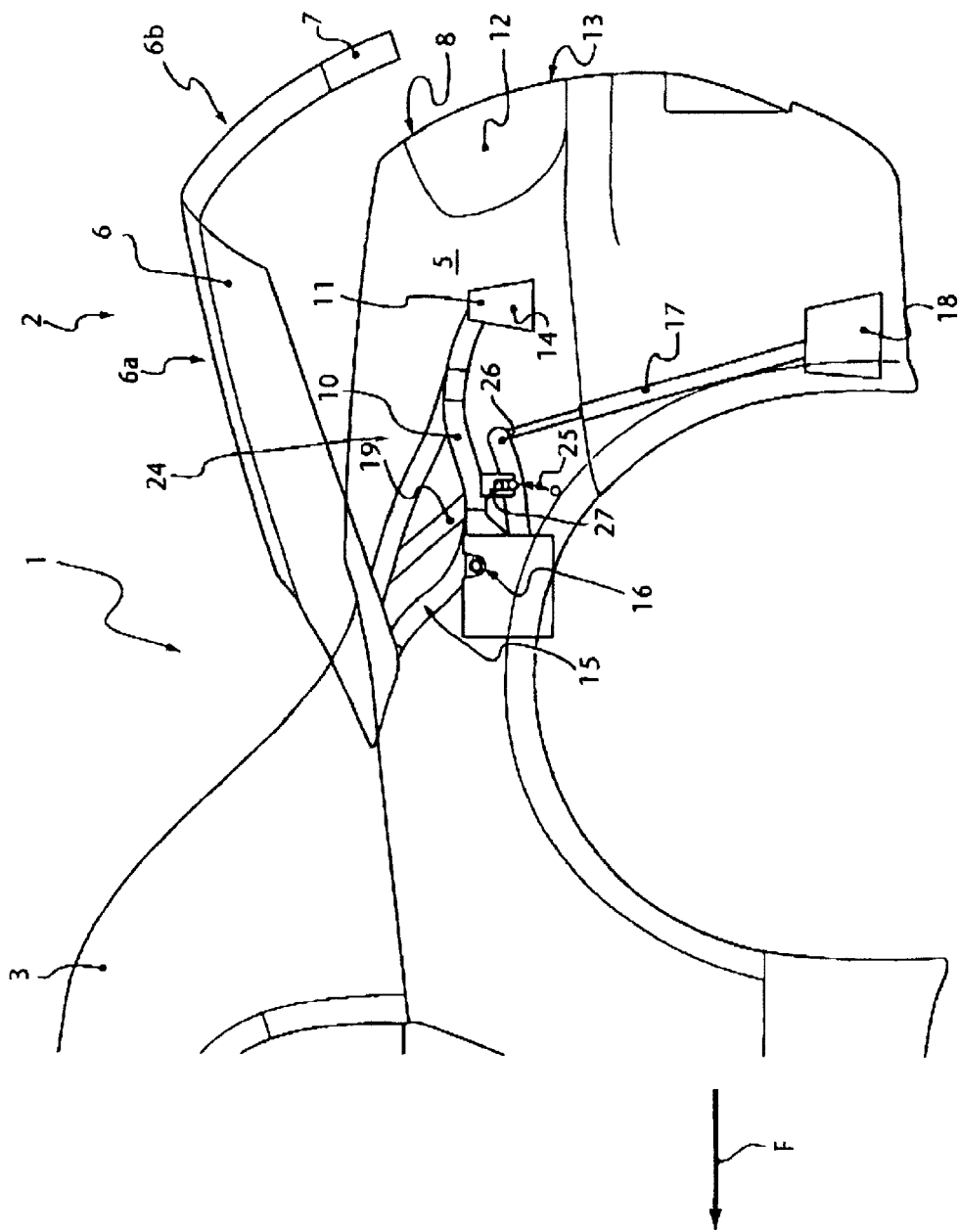
FIG. 2 is a view similar to FIG. 1 during the first movement phase for opening the lid part for releasing the through opening for the top.
Figure 3:
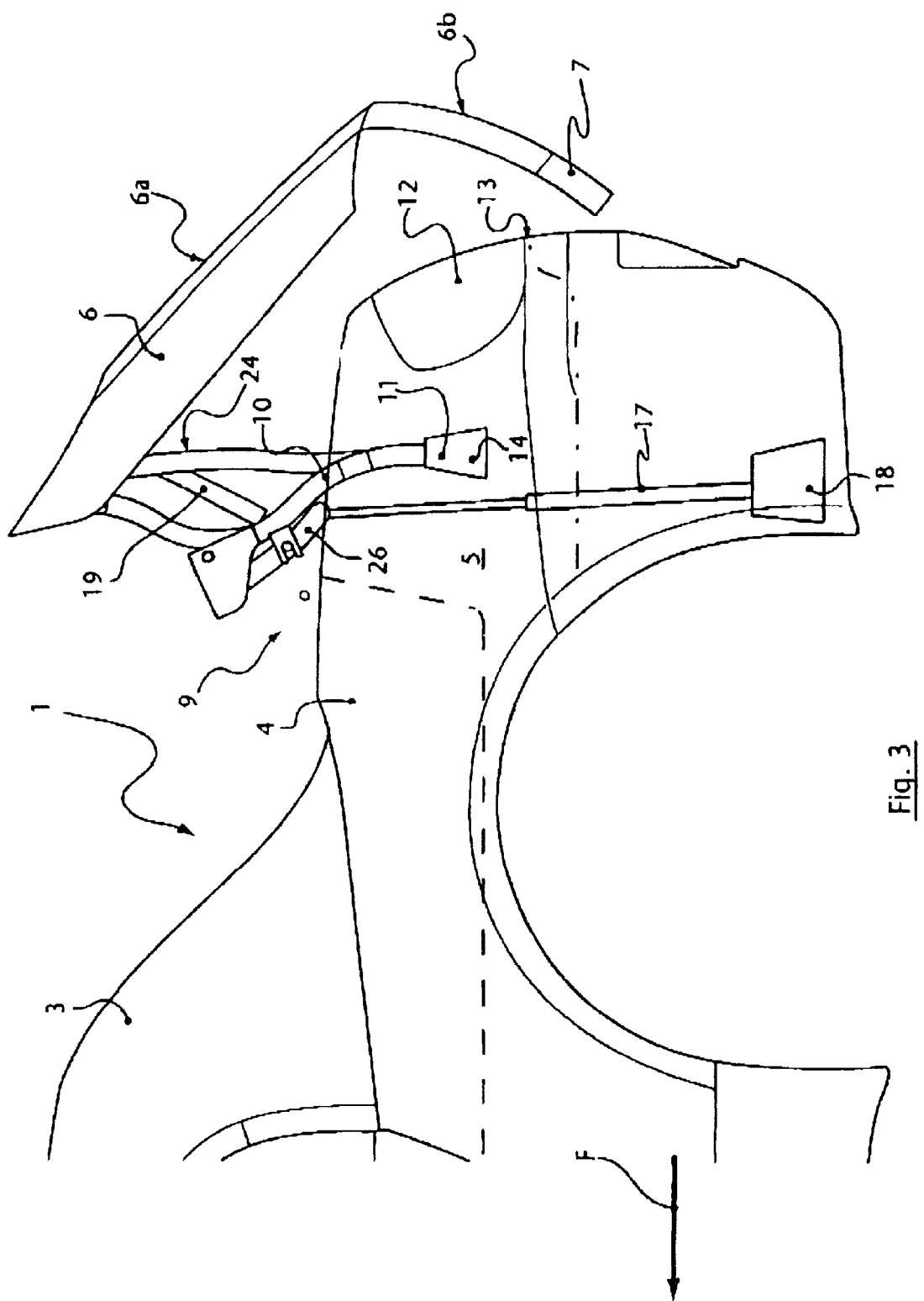
FIG. 3 shows in a view similar to FIG. 2 the subsequent second movement phase during opening of the lid part for releasing the through opening for the top.

The first embodiment of a convertible 1 illustrated in FIGS. 1 through 4 comprises a top 3 which can be stored within the rearward vehicle area 2. The top 3 can be of a rigid or flexible or partially rigid configuration. The top 3 can be positioned within a storage box 4 which is illustrated in FIG. 3 by dashed lines. The storage box 4 can be separated from the trunk space 5 permanently or variably; however, this is not mandatory.

Figure 4:
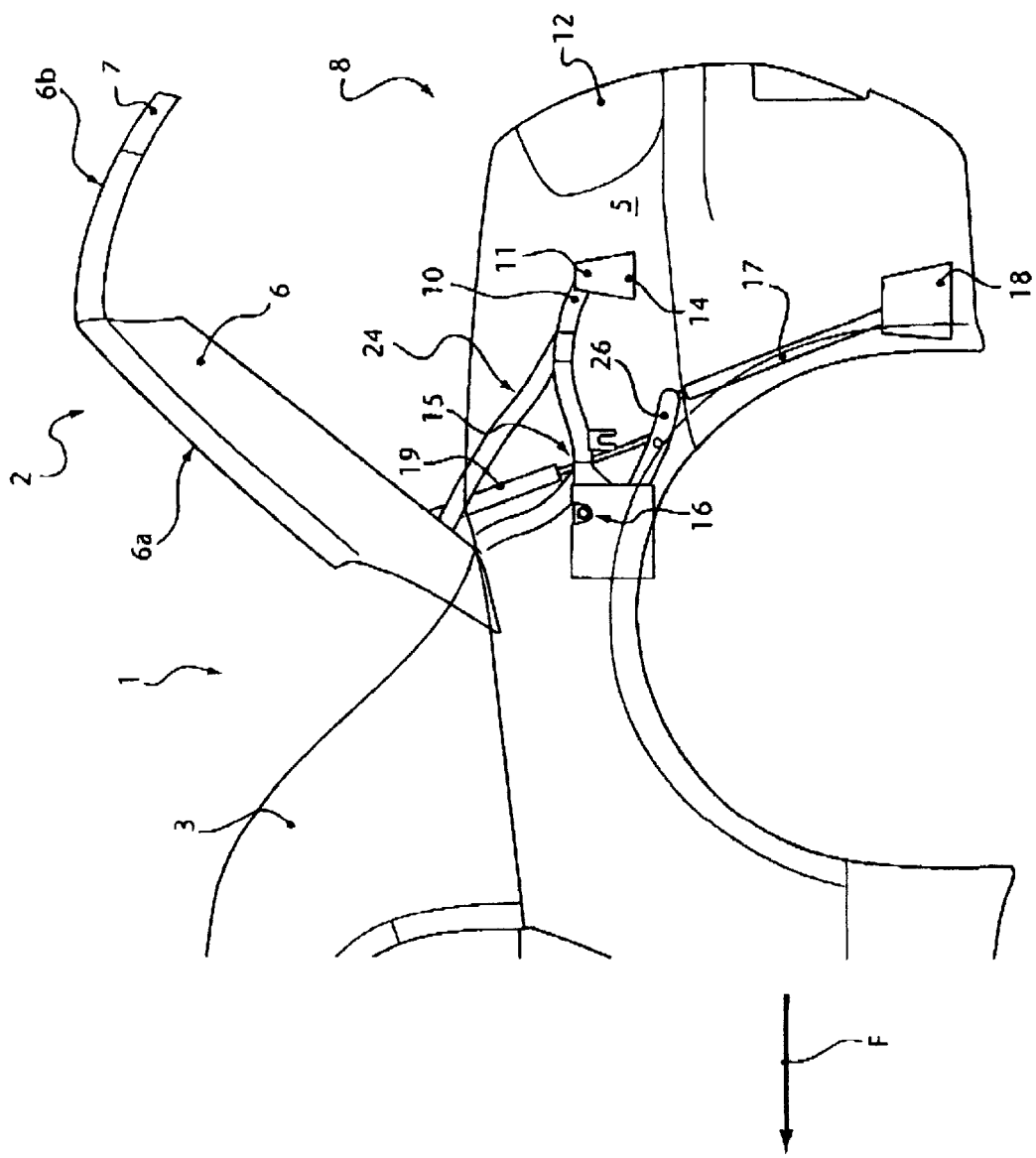
FIG. 4 shows in a view similar to FIG. 1 the release of the loading opening for luggage.

At least a portion of the storage box 4 is covered by a lid part 6 which has a dual function: according to FIGS. 2 and 3, it can be opened according to a first movement sequence for releasing the through opening 9 for the top 3, and, according to FIG. 4, it can be opened according to a second movement sequence for releasing a loading opening 8 for luggage provided adjacent to the terminal end or edge 7. The opening action according to the first movement sequence is assisted by an auxiliary frame 10 which is pivotably supported on the car body on a pivot axis 11 and supports from below the lid part 6. The pivot axis 11 extends transversely to the travel direction of the vehicle 1. In the illustrated embodiment, the pivot axis 11 is positioned such in front of the terminal end 7 of the lid part 6 that it is spaced from the taillights 12, typically by a spacing of approximately 10 cm to 40 cm. However, other spacings are also possible.

The lid part 6 comprises the lid portion 6a, which extends in the closed position substantially horizontally, and a substantially vertically adjoining rearward end 6b which has a terminal end 7 extending to and ending at a parting line 13 relative to the car body. The pivot axis 11 is positioned above this parting line 13 so that a bottom surface (illustrated in FIG. 3 in dashed lines) of the trunk space 5 is unaffected by bearing members 14 or the like for receiving the pivot axis 11.

In the rest position of the auxiliary frame 10 (FIG. 1) it is secured with the forward end 15 facing away from the pivot axis 11 in an additional securing means, such as a lock 16, for example, by lateral pins. In order to be able to move the auxiliary frame 10 out of this position into the open position for releasing the through opening 9 for the top 3 (FIG. 2, FIG. 3), at least one drive or drive-assisting element 17 is provided; advantageously, each vehicle side is provided with one such element 17. These drive-assisting elements 17 in the illustrated embodiment are gas pressure cylinders. It is also possible to employ hydraulic cylinders or the like. The drive or drive-assisting element 17 is secured in a receptacle 18 which is positioned in the travel direction in front of the pivot axis 11.

Each vehicle side is additionally provided with a second drive or drive-assisting element 19 which extends between the auxiliary frame 10 and the horizontal lid portion 6a of the lid part 6. This second drive-assisting members 19 are also embodied as gas pressure cylinders in the first embodiment (FIGS. 1 through 4). In addition, they are provided with the possibility to block their movement and to maintain in this way a constant spacing between the auxiliary frame 10 and the lid part 6 in such movement or rest phases in which the blocking action is activated. For this purpose, a valve 21 is provided in the piston 20 of the drive-assisting member 19 which separates the chamber 22 at the piston rod side from the chamber 23 at the piston bottom side and thus blocks or prevents gas exchange between the chambers 22, 23 in the blocked position. In this way, retraction or extension of the piston 20 is prevented; the gas pressure cylinder 19 is blocked. In the open position of the valve 21, a connection between the chambers 22 and 23 is present so that piston movement is possible. The piston 20 can be extended in a dampened fashion by pressure on the piston bottom side (chamber 23). Closing the lid part 6 relative to the auxiliary frame 10 is carried out against the force of the gas pressure spring 19.

The valve 21 is remote-controlled, for example, by means of a switch located on the dashboard, in order to thus release the blocking action. By means of the second drive or drive-assisting member 19, a multi-bar mechanism 24 (a four-bar configuration in the illustrated embodiment) can be opened by means of which the lid part 6 can be moved relative to the auxiliary frame 10, as long as the blocking action of the drive member 19 is released.

In order to open the lid part 6, starting from the closed position according to FIG. 1, for releasing the through opening 9 for the top 3, first the terminal end 7 of the lid part 6 is lifted by pivoting (FIG. 2). This lifting action is effected solely by the first drive elements 17; the second drive elements 19 remain in their blocked position. Accordingly, the auxiliary frame 10 remains in the locked initial position which it assumes also when the lid part 6 is closed. In order to be able to effect opening of the lid part 6 in the aforementioned direction despite the auxiliary frame 10 remaining in the initial position, the first drive members 17 are extended. A lever 26 connected with the drive member 17, respectively, is moved upwardly in the direction of arrow 25 out of its initial position. The second drive or drive-assisting member 19 is also connected to this lever 26, respectively. The lever 26 is pivoted upwardly to such an extent that it engages a stop 27 of the auxiliary frame 10. In this way, further opening in the aforementioned direction is prevented; the first movement phase for releasing the through opening 9 for the top 3 is complete. In the subsequent second movement phase, pivoting of the auxiliary frame 10 about the pivot axis 11 takes place; this is also effected by the further extension of the first drive member 17. The second drive for drive-assisting member 19 remains in the blocked state during the entire movement.

In order to be able to initiate the second movement phase, the blocking action of the forward part 15 of the auxiliary frame 10 in the lock 16 must first be released. The further extension movement of the first drive member 17 results automatically in the aforementioned pivot movement about the pivot axis 11 because of the lever 26 impacting on the stop 27. In this connection, the lid part 6 remains in the slightly opened angled position relative to the auxiliary frame 10. In this way it is possible, despite the forwardly displaced pivot axis 11, to avoid contact of the terminal end 7 of the lid part 6 on the car body. It is pivoted counter to the travel direction F into a position behind the rearward end area of the car body and can thus be located in its end position even below the parting line 13. A collision of the lid part 6 with the car body is thus prevented as a result of the movement to the rear.

Because of the changed kinematic pivot action, the forward edge of the lid part 6 remains relatively low even during the release of the through opening 9 for the top 3 illustrated in FIG. 3 because the pivot radius is smaller than in the arrangement of the pivot axis on the terminal end 7 of the lid part 6. Because it is moved downwardly, the lid part 6 overall remains in a relatively low position and can thus maintain its maximum height approximately within the area of the maximum height of the top 3. In this way, the risk of the lid part 6 impacting a low garage ceiling is reliably prevented.

The movement of the lid part 6 for releasing the loading opening 8 for luggage (FIG. 4) is carried out with the auxiliary frame 10 being secured and with the first drive element 17 been retracted. Only the multi-bar mechanism 24 is opened for which purpose the drive or drive-assisting member 19 is extended.

Figure 5:
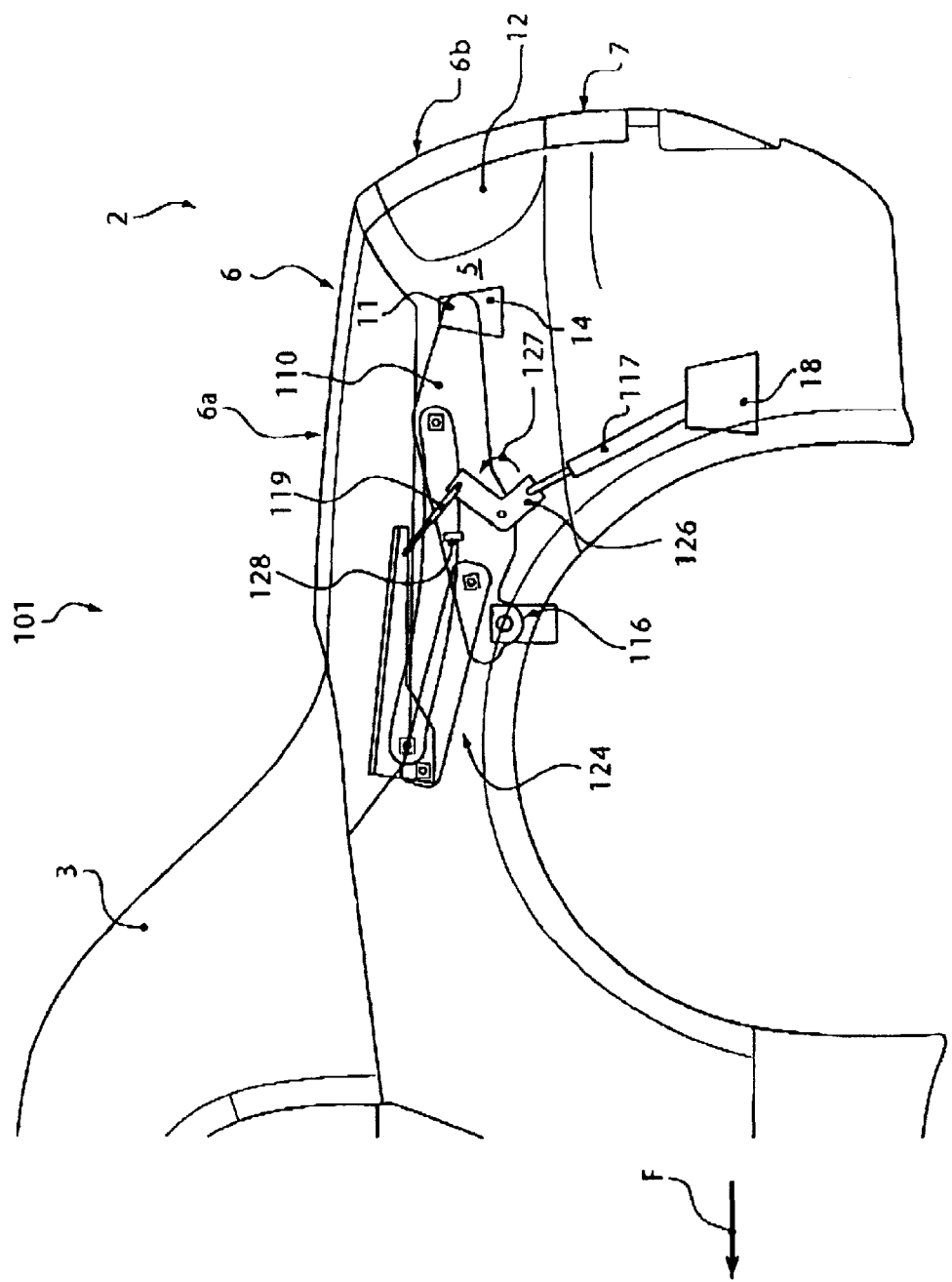
FIG. 5 is a view similar to FIG. 1 of a first alternative embodiment.

In FIG. 5 a further embodiment of a car 101 is illustrated which is configured in principle similar to that of FIGS. 1 through 4. In this configuration, pivoting of the terminal end 7 of the lid part 6 is effected initially by means of extension of the first drive element 117 for opening the lid part 6. While doing o, the second drive member 119 is blocked. The illustrated pivot lever 126, which is connected to the auxiliary frame 110 and connects the first drive element 117 with the second drive member 119, is pivoted in this connection in the direction of arrow 127. The auxiliary frame 110 is secured by the lock 116. As soon as the pivot lever 126 contacts the vertical stop 128, the lock 116 is released and the further extension of the first drive element 117 then effects the opening pivoting action about the pivot axis 11. The four-bar mechanism 124 remains closed during the entire opening sequence and opens only during the opposite movement sequence for releasing the loading opening 8.

Figure 6:
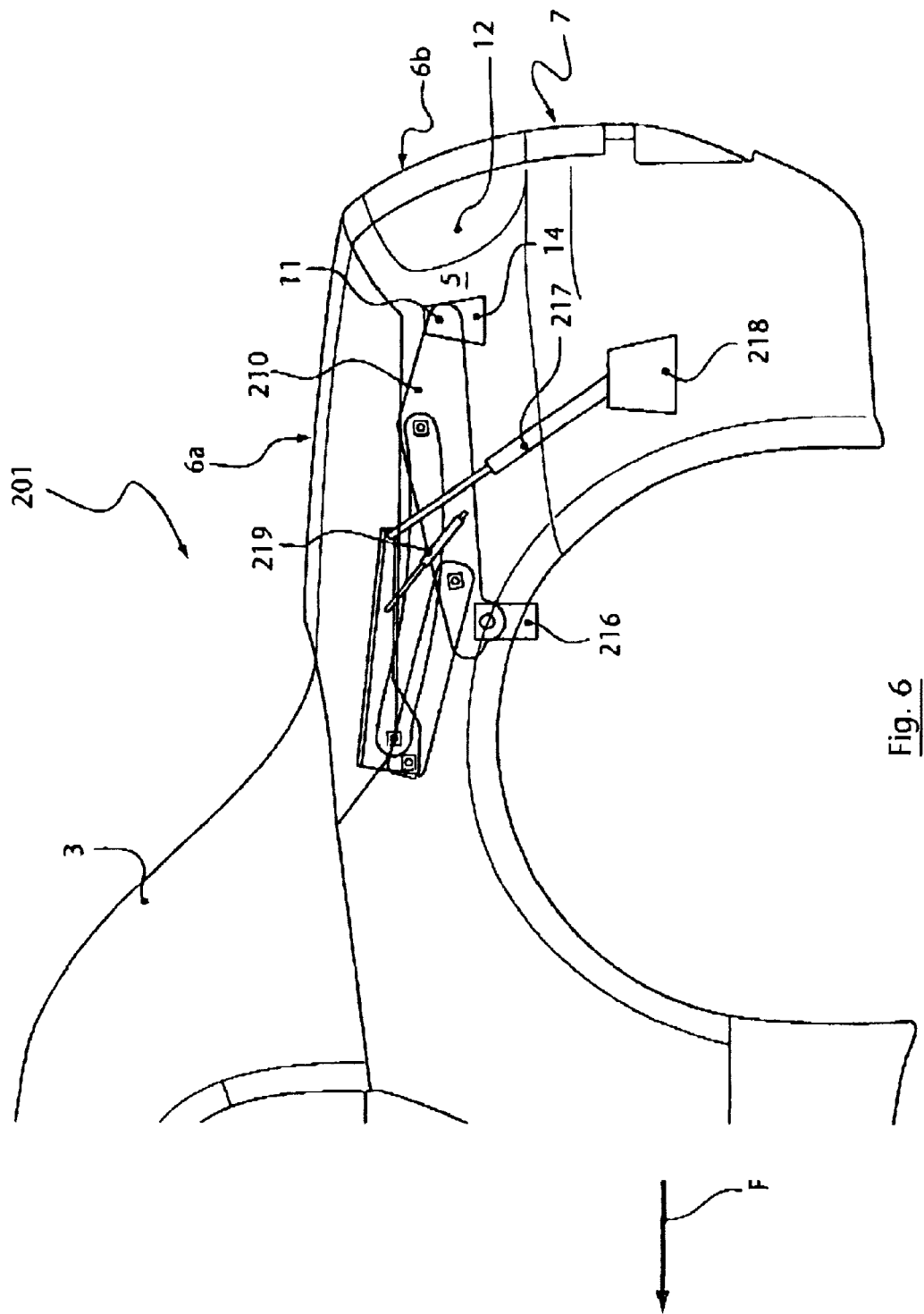
FIG. 6 is a view similar to FIG. 5 of a second alternative embodiment.

In the embodiment of a car 201 according to FIG. 6, the two phase movement is carried out in a similar way. In a first step, by extension of the first drive element 217, the pivot movement of the rearward area 7 is effected. The second drive member 219 is however not blocked because this would result in canting. In contrast to the preceding solutions, the first drive element 217 extends from the car body support 218 to the lid part 6 wherein the lid part 6 is connected by the second drive member 219 with the auxiliary frame 210. After release of the lock 216, it becomes movable about the axis 11 so that in the second movement phase again pivoting about this axis 11 can be achieved.

Figure 7:
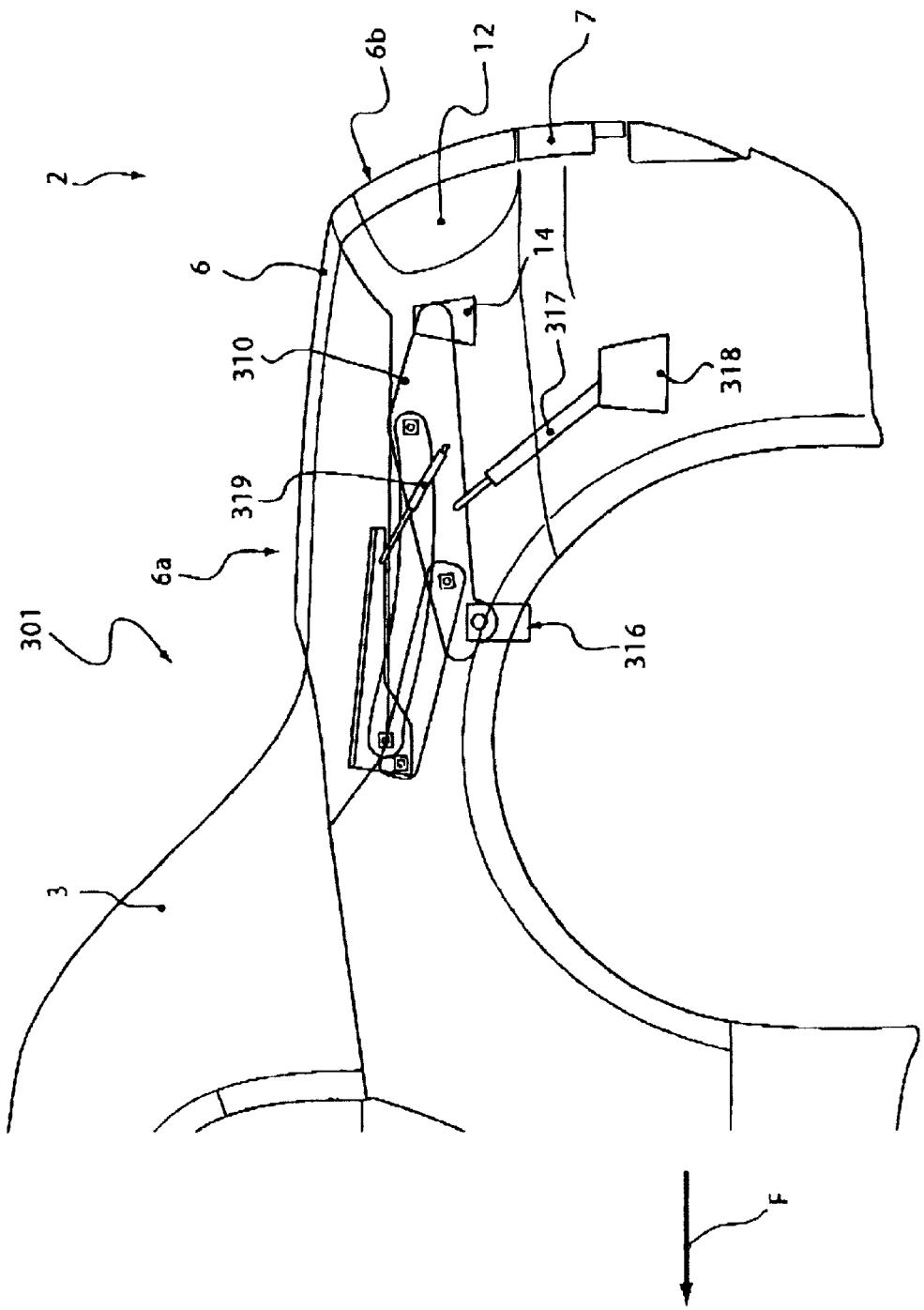
FIG. 7 is a view similar to FIG. 6 of a third alternative embodiment with hydraulic drive cylinders.

The car 301 according to FIG. 7 is similar to that of FIG. 5 wherein the drive elements 317 and 319 are however embodied as hydraulic cylinders, respectively.

Figure 8:
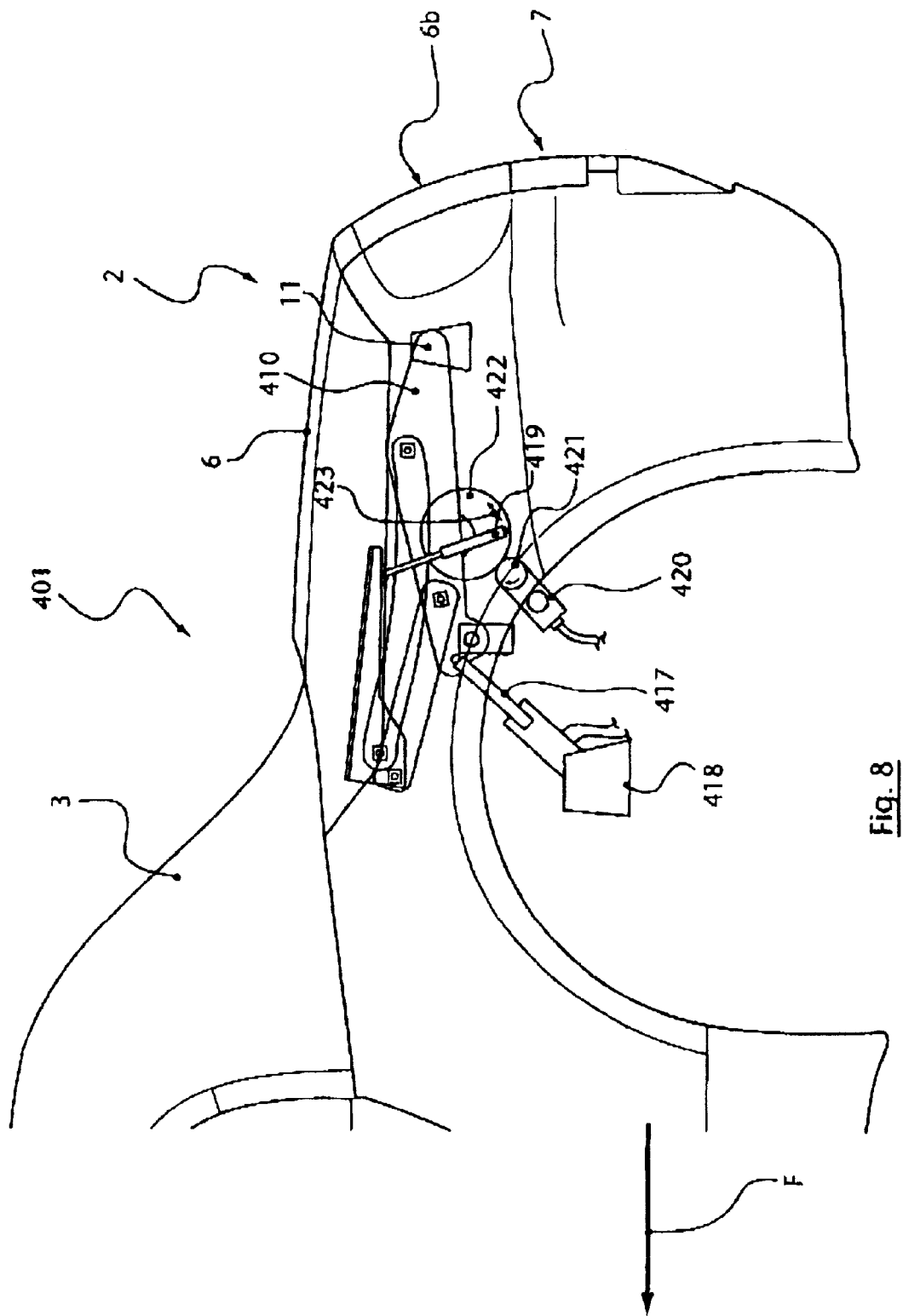
FIG. 8 shows in a view similar to FIG. 7 a fourth alternative embodiment.
Figure 9:
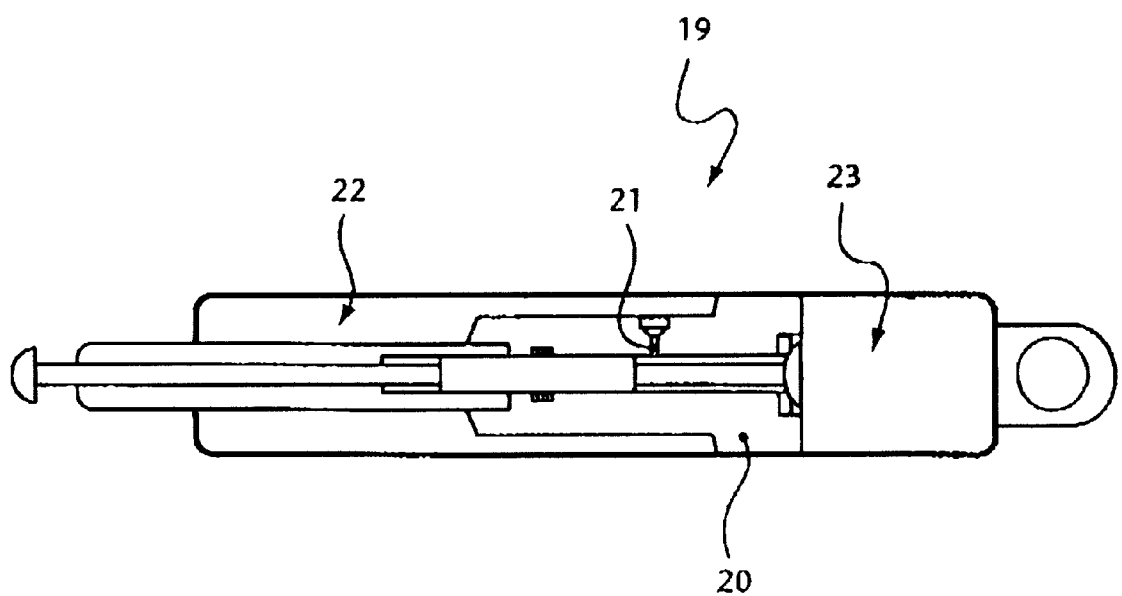
FIG. 9 is a detail view of a drive member.

In the car 401 according to FIG. 8, the connection 418 of the first drive element 417 engages the other end of the auxiliary frame 410. Moreover, an electric motor drive 420 is provided which can act on an eccentric disc 422 via a drive roller 421. This disc 422 serves as a support for the second drive member 419.

For opening the lid part according to the movement sequence in which the top 3 can be stowed, first a rotational force in the direction of arrow 423 is exerted onto the eccentric disc 422 by means of the motor drive 420. In this way, a force in the pivot direction of the terminal end 7 is effected via the drive element 419. From this lifted position, the lid part is opened similar to FIG. 3 by means of extension of the first drive element 417 for releasing the through opening 9 for the top 3.

For release of the through opening 9 for the top 3, in all illustrated embodiments the terminal end 7 of the lid part 6 is lifted first and only thereafter the pivot movement about the axis 11 is initiated which finally leads to the terminal end 7 being positioned underneath the parting line; in this way, a low pivot path has been achieved. Moreover, a conventional trunk lid lock can be used in the area of the parting line 13 because no parts of the pivot mechanism are arranged in this area. This simplifies assembly and lowers the production costs significantly.

Moreover, as a result of the changed kinematic pivot action, a very large through opening 9 for the top 3 can be created. A high stability of the lid part during opening is provided by blocking the multi-bar mechanism.

While specific embodiments of the invention have been shown and described in detail to illustrate the inventive principles, it will be understood that the invention may be embodied otherwise without departing from such principles.

What is claimed is:

1. A convertible comprising:
a car body;
a lid part arranged in a rearward area of the car body in a travel direction of the convertible;
a top connected to the car body and configured to be stowed in the rearward area of the convertible underneath the lid part;
wherein the lid part is configured to open and close for releasing a through opening for the top adjacent to a forward end of the lid part and for releasing a loading opening for luggage adjacent to a rearward end of the lid part;
an auxiliary frame arranged underneath the lid part in a closed position of the lid part;
wherein the auxiliary frame is connected to a pivot axis mounted on the car body so as to be pivotable about the pivot axis, wherein the pivot axis extends transversely to the travel direction;
wherein the pivot axis of the auxiliary frame, in the travel direction of the convertible, is arranged in front of the rearward end of the lid part.

2. The convertible according to claim 1, wherein the rearward end of the lid part is arranged substantially vertically and has a terminal end ending at a parting line relative to the car body wherein the pivot axis is displaced upwardly relative to the terminal end.

3. The convertible according to claim 1, wherein the pivot axis is located substantially above taillights of the convertible and in the travel direction in front of the taillights.

4. The convertible according to claim 1, further comprising at least one first drive element or drive-assisting element connected to the auxiliary frame, wherein the auxiliary frame, when the lid part is in a closed position and when the lid part is moved for release of the loading opening, remains in an initial position but is configured to be extended from the initial position by the at least one drive element or drive-assisting element.

5. The convertible according to claim 4, wherein the first drive element or drive-assisting element is supported on the car body in an area located in front of the pivot axis in the travel direction.

6. The convertible according to claim 4, further comprising at least one second drive element or drive-assisting element between the auxiliary frame and the lid part, wherein the at least one drive element or drive-assisting element remains in a retracted position when the through opening for the top is released and is configured to be blocked in the retracted position.

7. The convertible according to claim 6, wherein the at least one drive or drive-assisting element is a gas pressure cylinder comprising a piston and having a securing position in which gas exchange between a piston rod side and a piston bottom side of the piston is blocked.

8. The convertible according to claim 7, wherein the gas pressure cylinder has a valve for enabling gas exchange between the piston rod side and the piston bottom side.

9. The convertible according to claim 8, wherein the valve is remote-controlled.

10. The convertible according to claim 1, further comprising a multi-bar mechanism connected to the lid part and the auxiliary frame, wherein, for releasing the loading opening for the luggage, the lid part is moved into an open position by the multi-bar mechanism relative to the auxiliary frame while the auxiliary frame is secured in a stationary position.

11. A convertible comprising:
a car body;
a lid part arranged in a rearward area of the car body in a travel direction of the convertible;
a top connected to the car body and configured to be stowed in the rearward area of the convertible underneath the lid part;
wherein the lid part is configured to open and close for releasing a through opening for the top adjacent to a forward end of the lid part and for releasing a loading opening for luggage adjacent to a rearward end of the lid part;
wherein the lid part is moveable in a first movement sequence for releasing the through opening for the top and movable in an alternative second movement sequence for releasing the receiving opening for luggage;

wherein the first movement sequence comprises opening of the rearward end of the lid part and subsequently pivoting of the lid part into an open position about a pivot axis forwardly displaced in the travel direction relative to the rearward end of the lid part.

12. The convertible according to claim 11, further comprising an auxiliary frame connected to the lid part, wherein the auxiliary frame in the first movement sequence, when opening the rearward end of the lid part, is secured in a blocked initial position and during the subsequent pivoting of the lid part is released from the blocked position.

13. The convertible according to claim 11, wherein during the first movement sequence the rearward end of the lid part is movable to the rear of the convertible and downward relative to a rest position of the rearward end assumed by the rearward end when the lid part is in a closed position.

* * * * *